(12) United States Patent
Fleming, III et al.

(10) Patent No.: US 6,625,444 B1
(45) Date of Patent: Sep. 23, 2003

(54) METHOD OF PROGRAMMING A TELEPHONE

(75) Inventors: Hoyt A. Fleming, III, Boise, ID (US); Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/241,426

(22) Filed: Feb. 2, 1999

(51) Int. Cl.⁷ .................................................. H04M 3/00
(52) U.S. Cl. ....................... 455/418; 455/114; 455/112; 455/466; 379/201; 379/207
(58) Field of Search ................................. 455/414, 412, 455/418, 419, 420, 564, 89, 466; 379/201, 207, 58

(56) References Cited

U.S. PATENT DOCUMENTS

| | | |
|---|---|---|
| 5,062,132 A | 10/1991 | Yasuda et al. |
| 5,109,403 A | 4/1992 | Sutphin |
| 5,247,565 A | 9/1993 | Joglekar et al. |
| 5,247,700 A | 9/1993 | Wohl et al. |
| 5,339,352 A | 8/1994 | Armstrong et al. |
| 5,452,346 A | 9/1995 | Miyamoto |
| 5,457,732 A * | 10/1995 | Goldberg ..................... 379/57 |
| 5,485,505 A | 1/1996 | Norman et al. |
| 5,561,705 A | 10/1996 | Allard et al. |
| 5,568,546 A | 10/1996 | Marutiak |
| 5,689,547 A * | 11/1997 | Molne ........................ 379/58 |
| 5,722,084 A | 2/1998 | Chakrin et al. |
| 5,737,700 A | 4/1998 | Cox et al. |
| 5,764,731 A * | 6/1998 | Yablon |
| 5,768,362 A | 6/1998 | Moon |
| 5,797,098 A | 8/1998 | Schroeder et al. |
| 5,828,956 A | 10/1998 | Shirai |
| 5,930,703 A | 7/1999 | Cairns |
| 5,940,484 A | 8/1999 | DeFazio et al. |
| 5,940,752 A | 8/1999 | Henrick |
| 5,974,312 A | 10/1999 | Hayes, Jr. et al. |
| 5,995,826 A * | 11/1999 | Cox |
| 6,049,796 A * | 4/2000 | Siitonen |
| 6,081,583 A | 6/2000 | Cheng et al. |
| 6,122,347 A | 9/2000 | Borland |
| 6,122,503 A | 9/2000 | Daly |
| 6,215,854 B1 * | 4/2001 | Walance ..................... 379/3 |
| 6,215,994 B1 | 4/2001 | Schmidt et al. |
| 6,292,668 B1 | 9/2001 | Alanara et al. |
| 6,321,098 B1 | 11/2001 | Beith et al. |
| 6,377,950 B1 * | 4/2002 | Peters et al. .................. 707/10 |
| 6,456,709 B1 * | 9/2002 | Cox et al. ............... 379/218.01 |
| 2002/0004382 A1 * | 1/2002 | Cox |

FOREIGN PATENT DOCUMENTS

| | | |
|---|---|---|
| JP | 4126433 A | 4/1992 |
| WO | WO 94/30023 | 12/1994 |

OTHER PUBLICATIONS

U.S. patent application Ser. No. 09/217,065, Fleming, III, filed Dec. 21, 1998.
U.S. patent application Ser. No. 09/217,254, Fleming, III, filed Dec. 21, 1998.
U.S. patent application Ser. No. 09/217,255, Fleming, III, filed Dec. 21, 1998.
Mobile Office DI 27. Mobile Office DI 27 for *GSM* 1990. http://www.ericsson.se/US/phones/data/dpy90131.htm (Nov. 15, 1998).

* cited by examiner

*Primary Examiner*—Edward F. Urban
*Assistant Examiner*—Khawar Iqbal
(74) *Attorney, Agent, or Firm*—Perkins Coie LLP

(57) ABSTRACT

A method and telephone apparatus that places a telephone call to a directory assistance system and verbally provides the system with information identifying an entity is provided. The directory assistance system transmits data including at least the phone number and alphanumeric identifier of the entity to the telephone. Upon receipt of the data from the directory assistance system, the data is stored into the memory of the telephone. Thus, the telephone is automatically programmed with at least a telephone number and its associated alphanumeric identifier. Accordingly, the telephone number can later be recalled and dialed through the use of the alphanumeric identifiers.

38 Claims, 7 Drawing Sheets

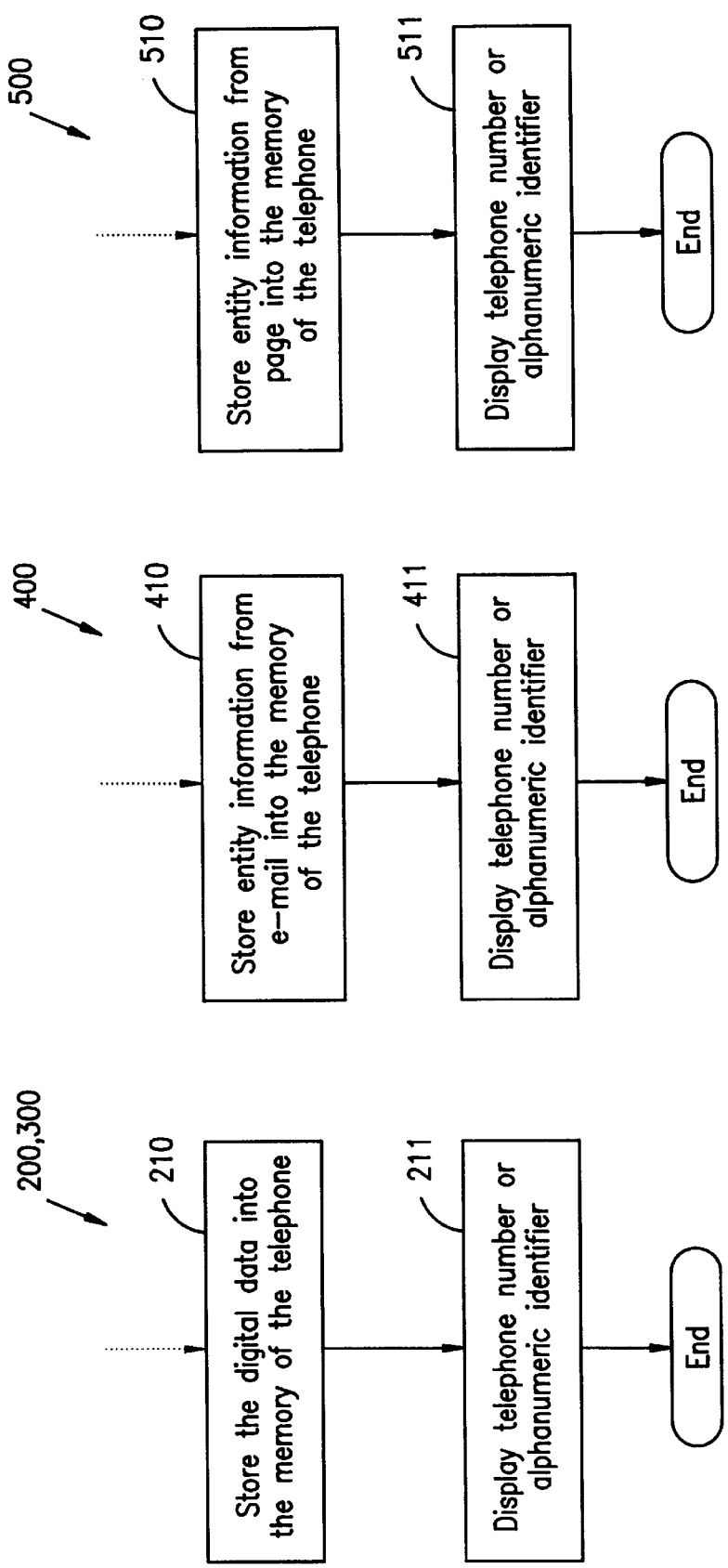

METHOD OF PROGRAMMING A TELEPHONE

BACKGROUND OF THE INVENTION

1. Field of the Invention

The present invention relates to the field of telephones and, more particularly to a method of programming telephone numbers and telephone number identifiers into a telephone.

2. Description of the Related Art

In recent years, public use of wireless communication devices, such as wireless telephones, has increased greatly. Wireless telephones, such as cellular telephones, are typically either independently powered hand-held units or are mounted in vehicles.

Because of their mobility, wireless telephones must be light and compact. A user needs to be able to comfortably carry the telephone in a pocket, purse or briefcase. For example, it is common for a wireless telephone to have only a liquid crystal display (LCD), a numeric keypad, a very limited number of control buttons, such as a clear/end button, a send button and a power button. A personal digital assistant (PDA) incorporating a wireless telephone might include a touch sensitive or pen-based screen in addition to the above list of user-interface devices.

In recent years, wireless telephones have been manufactured with operating features identical to those found in conventional telephones. In addition, wireless telephones have been manufactured with paging and PDA features. Despite all of the technological advancements, wireless telephones are not without their shortcomings. For example, today's wireless telephones allow a user to program their frequently dialed telephone numbers into the memory of their telephone for later rapid dialing, but this programming function must be performed manually. Manual programming of the wireless telephone can take time and requires the user to remember how to perform the steps required to carry out the programming function.

The user can refer to the wireless telephone user manual to determine the steps required to properly program telephone numbers into the telephone. This, however, is not preferred since these manuals are rarely, if ever, carried around with the telephone. Without the manual the user will not be able to manually program telephone numbers into the wireless telephone. Even if the user locates the telephone manual, the user may still have difficulty in programming telephone numbers into the wireless telephone since some users may not understand the lengthy and detailed instructions. Accordingly, there is a need and desire for a method and apparatus for automatically programming telephone numbers into a wireless telephone.

Moreover, most wireless telephones also allow the user to associate and program an alphanumeric identifier for each telephone number stored in the telephone's memory. These alphanumeric identifiers may then be used to quickly recall and dial a stored telephone number without requiring a user to remember the called party's telephone number. Unfortunately, this programming function must also be performed manually and suffers from at least the same drawbacks associated with the programming of dialed phone numbers. Accordingly, there is a need and desire for a method and apparatus for automatically programming a telephone number's alphanumeric identifier into a wireless telephone.

SUMMARY OF THE INVENTION

The present invention provides a method and apparatus for automatically programming telephone numbers into a wireless telephone.

The present invention also provides a method and apparatus for automatically programming a telephone number's alphanumeric identifier into a wireless telephone.

The above and other features and advantages of the invention are achieved by a method and telephone apparatus that places a telephone call to a directory assistance system and verbally provides the system with information identifying an entity. The directory assistance system transmits data including at least the phone number and alphanumeric identifier of the entity to the telephone. Upon receipt of the data from the directory assistance system, the data is stored into the memory of the telephone. Thus, the telephone is automatically programmed with at least a telephone number and its associated alphanumeric identifier. Accordingly, the telephone number can later be recalled and dialed through the use of the alphanumeric identifiers.

BRIEF DESCRIPTION OF THE DRAWINGS

The foregoing and other advantages and features of the invention will become more apparent from the detailed description of the preferred embodiments of the invention given below with reference to the accompanying drawings in which:

FIGS. 7a–7c are flow charts illustrating modifications of the automatic telephone number and alphanumeric identifier programming processes of FIG. 3–6.

DETAILED DESCRIPTION OF PREFERRED EMBODIMENTS

Although the invention is described below in the context of a cellular wireless telephone, the invention is not so limited and may be used with any type of wireless telephone or other wireless communication device where a series of numbers and/or symbols must be entered to establish a connection to a called party. Accordingly, the below detailed description of use of the invention with a cellular telephone is only representative and not limiting of the invention. Other embodiments may be utilized and structural, logical, or programming changes may be made without departing from the spirit or scope of the present invention.

Figure 1:
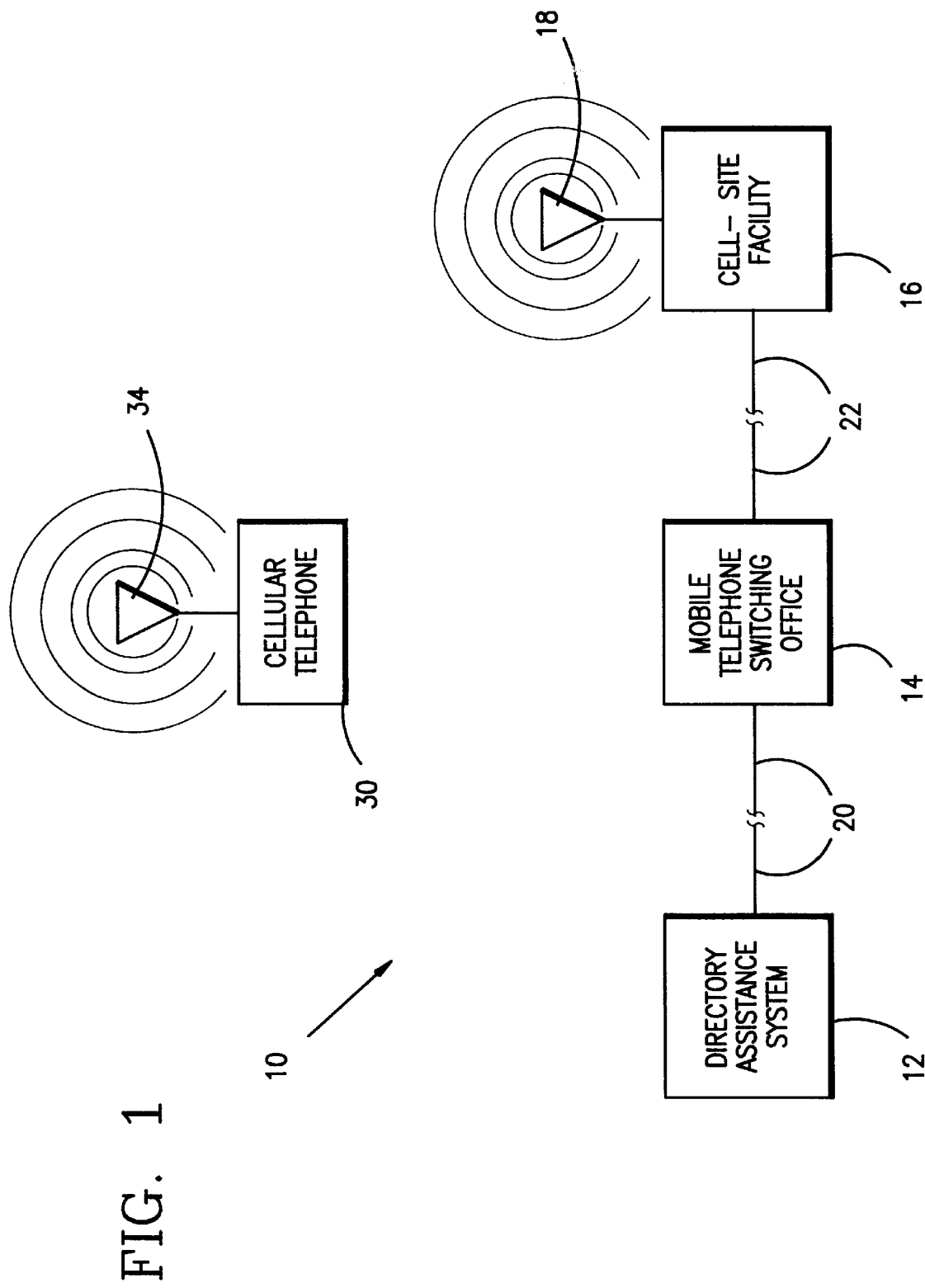
FIG. 1 illustrates a block diagram of a cellular telephone system which can be used to practice the present invention.

FIG. 1 illustrates a block diagram of a cellular telephone system 10 which can be used to practice the present invention. The system 10 includes a directory assistance system 12 connected by a telephone line 20 to a Mobile Telephone Switching Office (MTSO) 14. The MTSO 14 is connected by a telephone line 22 to cellular telephone facility 16 (also referred to herein as a "cell-site facility 16"). The cell-site facility 16 includes an antenna 18 for transmitting voice and digital information via various voice and digital channels to an antenna 34 of a cellular telephone 30. The antenna 18 of the cell-site facility 16 is also used to receive voice and digital information via the various voice and digital channels from the antenna 34 of the cellular telephone 30. The system 10 could include more cell-site facilities 16 and cellular telephones 30 if so desired, but only one of facility 16 and telephone 30 are illustrated for convenience purposes.

As will be discussed below with reference to FIGS. 3–6, the present invention will utilize the directory assistance system 12 to retrieve at least telephone numbers associated alphanumeric identifiers entities which are to be programmed into the telephone 30. The directory assistance system 12 is a conventional. An example of a directory assistance system 12 which can be utilized by the present invention is found in U.S. Pat. No. 5,737,700 (Cox et al.), which is hereby incorporated by reference in its entirety. The system 12 will contain a database of at least telephone numbers and alphanumeric identifiers associated with each telephone number. The database residing in the directory assistance system 12 may also contain other information associated with each telephone number in the database. Additional information may include street address, city, state and any other information desired by the users of the cellular telephone 30. The directory assistance system 12 will be operated by a telephone company, cellular service provider, or a company that manufactures and/or distributes cellular telephones.

As will be discussed below, the directory assistance system 12 is configured to receive telephone calls, input information concerning a entity, perform a database search based on the input information and output via digital data at least a telephone number and its corresponding alphanumeric identifier associated with the input entity information. As will be discussed below, the directory assistance system 12 may output the telephone number and alphanumeric identifier (and other information if necessary) either directly over the telephone line 20, via e-mail or even by paging the cellular telephone 30 (if the cellular telephone 30 has the e-mail or paging capabilities). The directory assistance system 12 may utilize a human operator or voice activated equipment to input the entity information received from the telephone 30. The use of voice activated equipment in a directory assistance system 12 is well known in the art.

The invention is implemented on the cellular telephone side by the provision of some additional programming of the cellular telephone processor to enable the telephone to carry out the operations described herein. The invention may be implemented in any conventional cellular telephone which includes a processor to control the complex functions of the cellular telephone. Thus, the invention is not restricted to any particular cellular telephone circuit architecture.

Figure 2:
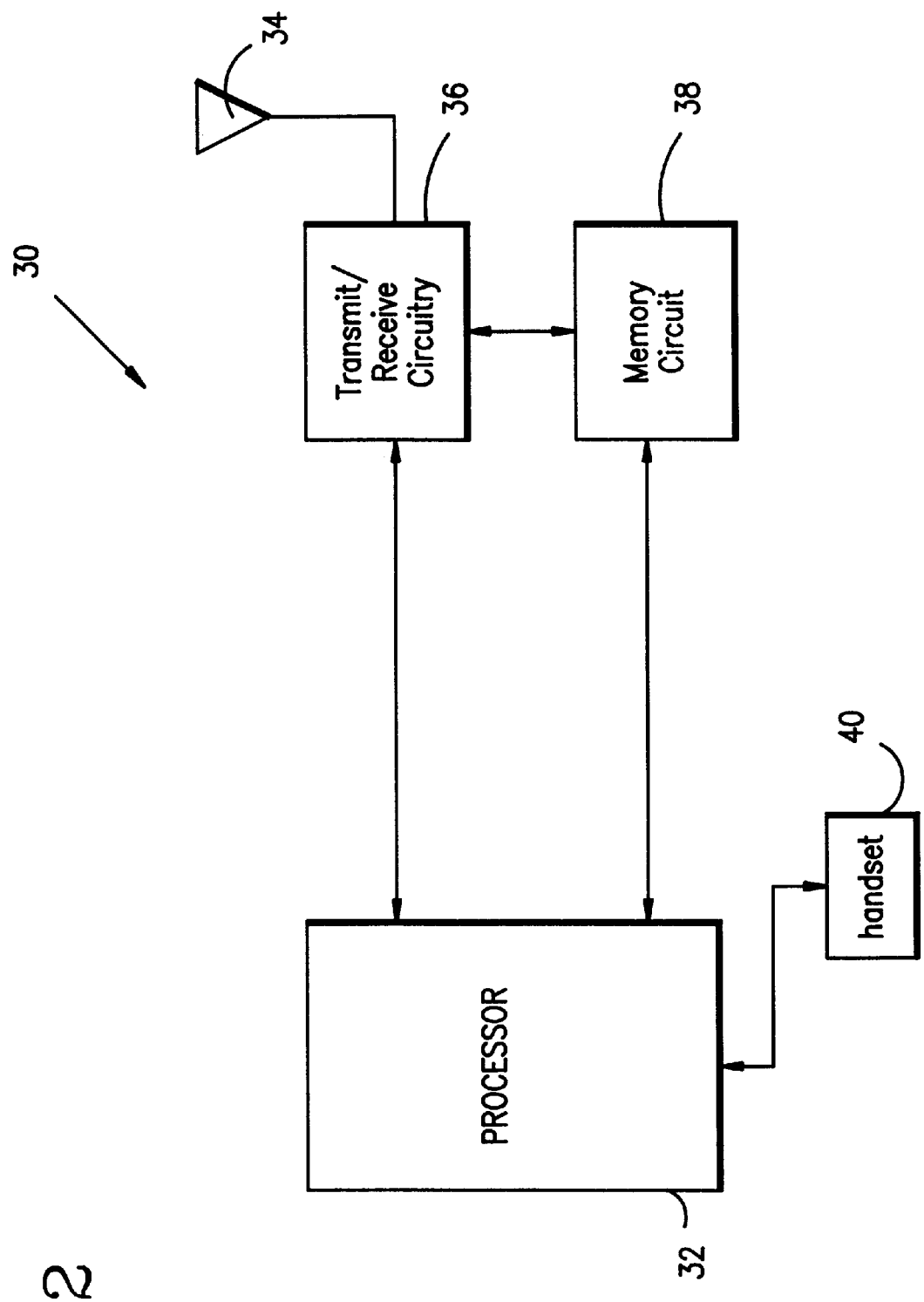
FIG. 2 illustrates an exemplary cellular telephone used in the system of FIG. 1.

U.S. Pat. No. 5,109,403 to Sutphin shows one representative telephone circuit and associated processor which can be programmed to implement the invention and the disclosure of this patent is incorporated herein by reference. The '403 patent includes a microcomputer processor called a controller which interacts with various other circuits to enable the telephone to perform its cellular telephone operations. This controller is further programmed as described below to implement the invention. FIG. 2 illustrates in a high level block diagram a cellular telephone 30 having a processor serving as a controller 32, transmit/receive circuitry 36, memory circuit 38, antenna 34 and a handset 40 representative of the telephone disclosed in the '403 patent.

Figure 3:
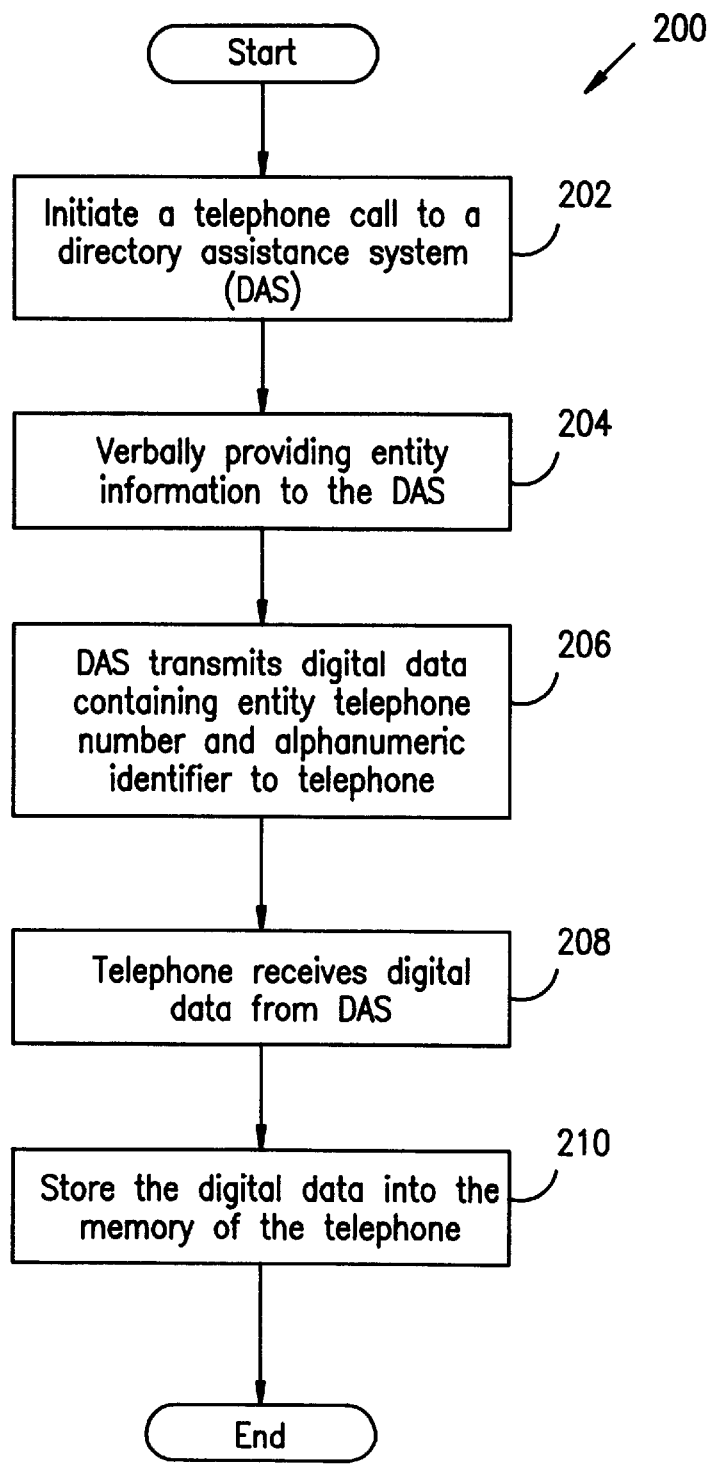
FIG. 3 is a flow chart illustrating a first embodiment of an automatic telephone number and alphanumeric identifier programming process performed by the present invention.

FIG. 3 is a flow chart illustrating a first embodiment of an automatic telephone number and alphanumeric identifier programming process 200 performed by the present invention. Initially, the process 200 begins when a user initiates a telephone call to the directory assistance system (DAS) from the user's telephone (step 202). At step 202, the user verbally provides information about an entity to the DAS so that the DAS may search for and retrieve at least a telephone number and alphanumeric identifier corresponding to the entity. The information may include the entity's name, address or any other information that would aid in the search for the entity's telephone number. The entity may be, for example, a person, company or an association.

At this point, the DAS searches for the telephone number and alphanumeric identifier (and other information if desired) based upon the entity information received from the user. As stated earlier, the DAS may include a human operator or voice activated equipment to input the entity information and initiate a search for a telephone number and other desired entity data.

At this point, the DAS accesses its database of telephone numbers and alphanumeric identifiers based upon the entity information received by the user and retrieves at least the telephone number and alphanumeric identifier associated with the entity. As stated above, depending on the capabilities of the telephone, the DAS may also retrieve addressing or other pertinent information associated with the entity. Once retrieved, the DAS transfers the telephone number and alphanumeric identifier (and other information if necessary) to the telephone in the form of digital data (step 206).

The digital data containing the entity telephone number and alphanumeric identifier (and any other information if necessary) is received by the telephone (step 208) and the data is stored into the memory of the telephone (step 210). The telephone number and alphanumeric identifier (and any other information) will be stored in a non-volatile or EEPROM memory to preserve the information. If temporary memory was used throughout the process 200, then the information must be transferred to the non-volatile or EEPROM memory before the telephone is powered down.

Once the entity telephone number and its alphanumeric identifier are programmed into the memory of the telephone, the user may use the identifier to initiate telephone calls to the entity without dialing or even remembering its telephone number.

Figure 4:
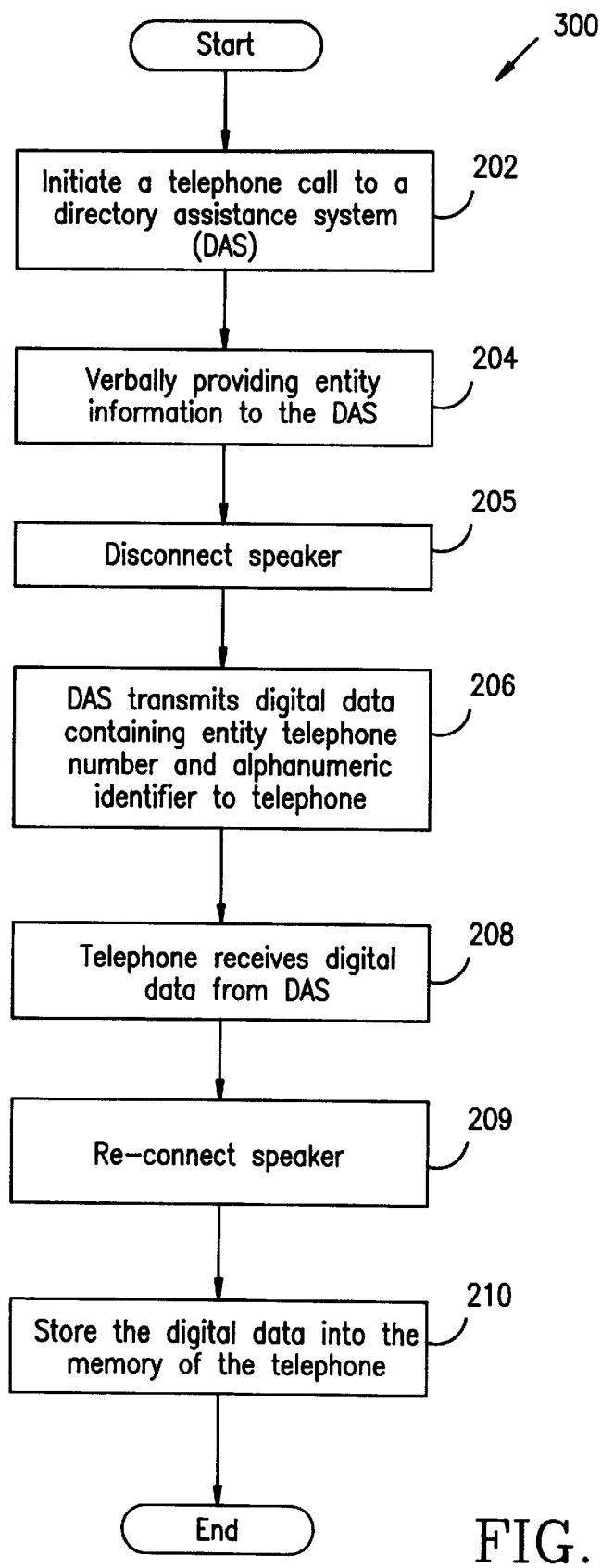
FIG. 4 is a flow chart illustrating a second embodiment of an automatic telephone number and alphanumeric identifier programming process performed by the present invention.

FIG. 4 is a flow chart illustrating a second embodiment of an automatic telephone number and alphanumeric identifier programming process 300 performed by the present invention. The process 300 is essentially the same as the process 200 (FIG. 3) except that the telephone's speaker is disconnected prior to the receipt of the digital data from the DAS (step 205). This would prevent the user from hearing loud tones associated with the transmission of the digital data. The speaker could then be reconnected after all of the digital data has been received from DAS (step 209).

Figure 5:
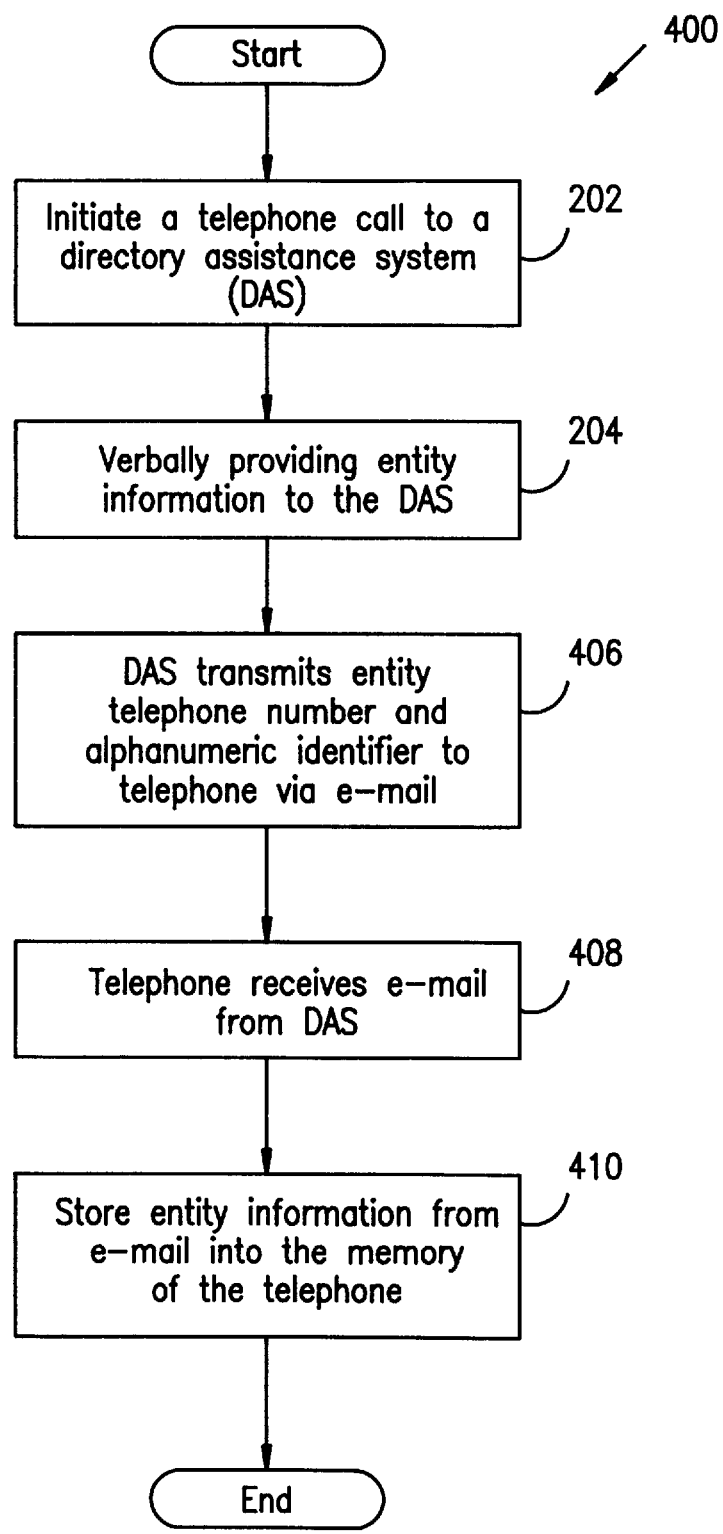
FIG. 5 is a flow chart illustrating a third embodiment of an automatic telephone number and alphanumeric identifier programming process performed by the present invention.

FIG. 5 is a flow chart illustrating a third embodiment of an automatic telephone number and alphanumeric identifier programming process 400 performed by the present invention. The process 400 is implemented when the telephone has an e-mail capability. The process 400 is essentially the same as the process 200 (FIG. 3) except that the DAS transfers the entity telephone number, alphanumeric identifier and other information associated with the entity via a subsequent short message service (SMS) e-mail to the user's telephone (step 406). The telephone receives the e-mail and parses out the entity telephone number and alphanumeric identifier (and other information) from the e-mail message (step 408). The information parsed out of the e-mail message is then stored into the memory of the telephone (step 410).

Figure 6:
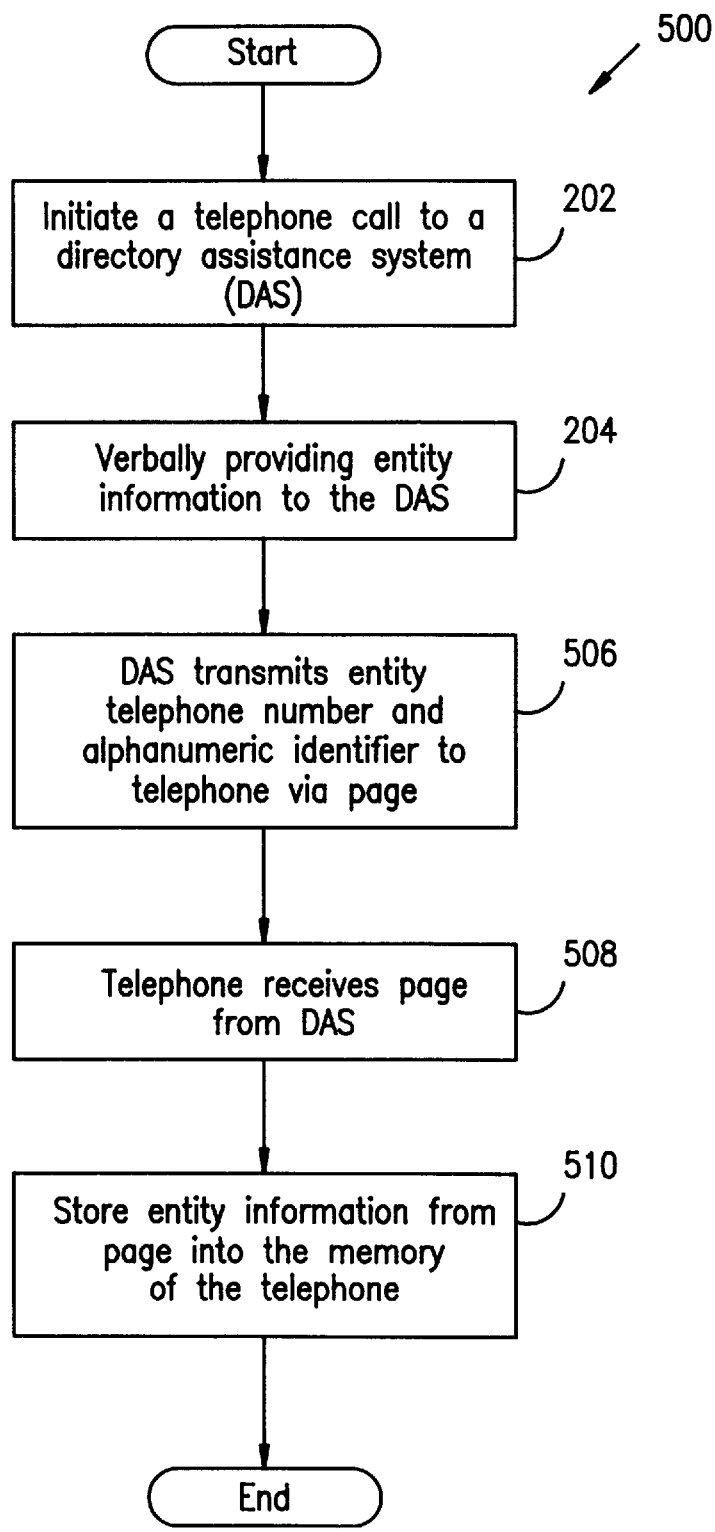
FIG. 6 is a flow chart illustrating a fourth embodiment of an automatic telephone number and alphanumeric identifier programming process performed by the present invention.

FIG. 6 is a flow chart illustrating a fourth embodiment of an automatic telephone number and alphanumeric identifier programming process 500 performed by the present invention. The process 500 is implemented when the telephone has a paging capability. The process 500 is essentially the same as the process 200 (FIG. 3) except that the DAS transfers the entity telephone number, alphanumeric identifier and other information associated with the entity via a subsequent page to the user's telephone (step 506). The telephone receives the page and parses out the entity telephone number and alphanumeric identifier (and other information) from the page (step 508). The information parsed out of the page is then stored into the memory of the telephone (step 510).

The present invention can be modified in several ways. Referring to FIGS. 7a–7c, for example, the stored entity telephone number or its alphanumeric identifier can be displayed on the telephone's display. This can be done as step 211 of process 200 (FIG. 3) inserted after step 210 and process 300 (FIG. 4) inserted after step 210, step 411 of process 400 (FIG. 5) inserted after step 410 or as step 511 of process 500 (FIG. 6) inserted after step 510.

The present invention is implemented in software and that the software instructions and data can be stored in PROM, EEPROM or other non-volatile memory of the telephone. The present invention can be stored on a hard drive, floppy disc, CD-ROM or other permanent or semi-permanent storage medium and subsequently transferred to the memory of the telephone. The program embodying the present invention can also be divided into program code segments, downloaded, for example, from a server computer or transmitted as a data signal embodied in a carrier wave to the telephone as is known in the art. In addition, the present invention can be implemented in hardware or a combination of hardware and software.

While the invention has been described in detail in connection with the preferred embodiments known at the time, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Accordingly, the invention is not to be seen as limited by the foregoing description, but is only limited by the scope of the appended claims.

What is claimed as new and desired to be protected by Letters Patent of the United States is:

1. A method of programming telephone numbers and identifiers into a telephone comprising:
   initiating at a telephone a telephone call to a directory assistance system;
   providing the system with information identifying an entity verbally;
   disconnecting a speaker of the telephone;
   thereafter, receiving at least a telephone number associated with the entity information from the directory assistance system, the at least a telephone number being received as a data signal from the directory assistance system which is decoded by the telephone; and
   storing the at least a telephone number into the memory of the telephone.

2. The method of claim 1 wherein the at least a telephone number comprises an entity telephone number and an alphanumeric identifier associated with the entity telephone number which is used by a user to retrieve and dial the entity telephone number.

3. The method of claim 2 further comprising the act of displaying the entity alphanumeric identifier on a display of the telephone after it is received from the directory assistance system.

4. The method of claim 1 wherein the data signal includes an alphanumeric identifier associated with the entity telephone number, the method further comprising parsing out the entity telephone number and the alphanumeric identifier from the data signal.

5. The method of claim 1 wherein the at least a telephone number further comprises an address associated with the entity.

6. The method of claim 1 further comprising the act of displaying the entity telephone number on a display of the telephone after it is received from the directory assistance system.

7. A telephone comprising:
   a first input device for inputting a telephone number;
   a second input device for inputting audio input into the telephone;
   a memory circuit;
   a speaker; and
   a programmed processor, said programmed processor
      initiating a telephone call to a directory assistance system based on an input telephone number;
      transmitting to the system audio input from the second input device;
      disconnecting the speaker;
      thereafter, receiving from the directory assistance system at least a telephone number associated with the audio input, the at least a telephone number being received as a data signal from the directory assistance system which is decoded by the telephone; and
      storing the at least a telephone number into said memory.

8. The telephone of claim 7 wherein the at least a telephone number comprises an entity telephone number and an alphanumeric identifier associated with the entity telephone number which is used by a user to retrieve and dial the entity telephone number.

9. The telephone of claim 8 further comprising:
   a display for displaying the entity alphanumeric identifier after it is received from the directory assistance system.

10. The telephone of claim 7 wherein the data signal includes an alphanumeric identifier associated with the entity telephone number and said processor parses out the entity telephone number and the alphanumeric identifier from the data signal.

11. The telephone of claim 7 wherein the at least a telephone number further comprises an address associated with the entity.

12. The telephone of claim 7 further comprising:
   a display for displaying the entity telephone number after it is received from the directory assistance system.

13. A telephone system comprising:
   a telephone comprising:
      a first input device for inputting a telephone number;
      a second input device for inputting audio input into the telephone;

a memory circuit;
a speaker; and
a programmed processor, said programmed processor:
  initiating a telephone call to a directory assistance system based on an input telephone number;
  transmitting to the directory assistance system audio input from the second input device:
  disconnecting the speaker;
  thereafter, receiving from the directory assistance system at least a telephone number associated with the audio input, the at least a telephone number being received as a data signal from the directory assistance system which is decoded by the telephone; and
  storing the at least a telephone number into said memory.

14. The system of claim 13 wherein the at least a telephone number comprises an entity telephone number and an alphanumeric identifier associated with the entity telephone number which is used by a user to retrieve and dial the entity telephone number.

15. The system of claim 14 further comprising:
a display for displaying the entity alphanumeric identifier.

16. The system of claim 13 wherein the data signal includes an alphanumeric identifier associated with the entity telephone number and said processor parses out the entity telephone number and the alphanumeric identifier from the data signal.

17. The system of claim 13 wherein the at least a telephone number further comprises an address associated with the entity.

18. The system of claim 13 further comprising:
a display for displaying the entity telephone number.

19. A telephone system comprising:
a telephone comprising:
  a first input device for inputting a telephone number;
  a second input device for inputting audio input into the telephone,
  a memory circuit;
  a speaker; and
  a controller coupled to said first input device, the second input device, the memory circuit, and the speaker, said controller:
    initiating a telephone call to a directory assistance system based on an input telephone number;
    transmitting to the directory assistance system audio input from the second input device;
    disconnecting the speaker;
    thereafter, receiving from the directory assistance system at least a telephone number associated with the audio input, the at least a telephone number being received as a data signal from the directory assistance system which is decoded by the telephone; and
    storing the at least a telephone number into said memory.

20. The system of claim 19 wherein the at least a telephone number comprises an entity telephone number and an alphanumeric identifier associated with the entity telephone number which is used by a user to retrieve and dial the entity telephone number.

21. The system of claim 20 further comprising:
a display coupled to said controller for displaying the entity alphanumeric identifier.

22. The system of claim 19 wherein the data signal includes an alphanumeric identifier associated with the entity telephone number and said controller parses out the entity telephone number and the alphanumeric identifier from the data signal.

23. The system of claim 19 wherein the at least a telephone number further comprises an address associated with the entity.

24. The system of claim 19 further comprising:
a display coupled to said controller for displaying the entity telephone number.

25. A method of programming a telephone number into a telephone comprising:
initiating at a telephone a telephone call to a directory assistance system;
providing the directory assistance system with information identifying an entity verbally;
receiving on the telephone an electronic mail message from the directory assistance system, the electronic mail message including a telephone number associated with the entity;
parsing the telephone number from the electronic mail message; and
storing the telephone number into a memory of the telephone.

26. The method of claim 25 wherein the electronic mail message also includes at least one alphanumeric identifier associated with the entity, the at least one alphanumeric identifier being parsed from the electronic mail message and stored into the memory.

27. The method of claim 25 further comprising displaying the telephone number on a display of the telephone after it is parsed from the electronic mail message.

28. The method of claim 25 further comprising initiating a telephone call to the entity using the stored telephone number.

29. A method of programming a telephone number into a telephone comprising:
initiating at a telephone a telephone call to a directory assistance system;
providing the directory assistance system with information identifying an entity verbally;
receiving on the telephone a page from the directory assistance system, the page including a telephone number associated with the entity;
parsing the telephone number from the page; and
storing the telephone number into a memory of the telephone.

30. The method of claim 29 wherein the page also includes at least one alphanumeric identifier associated with the entity, the at least one alphanumeric identifier being parsed from the page and stored into the memory.

31. The method of claim 29 further comprising displaying the telephone number on a display of the telephone after it is parsed from the page.

32. The method of claim 29 further comprising initiating a telephone call to the entity using the stored telephone number.

33. A telephone comprising:
a first input device adapted to input a telephone number;
a memory circuit;
a speaker; and
a programmed processor, the programmed processor being adapted to:
  initiate a telephone call to a directory assistance system based on an input telephone number;
  provide the directory assistance system with verbal information identifying an entity;

disconnect the speaker;
thereafter, parse a telephone number associated with the entity from a data signal received from the directory assistance system;
after the data signal is received, re-connect the speaker; and
store the telephone number into a memory of the telephone.

34. A telephone comprising;
a first input device adapted to input a telephone number;
a microphone;
a memory circuit;
a speaker; and
a programmed processor, the programmed processor being adapted to:
  initiate a telephone call to a directory assistance system based on an input telephone number;
  provide the directory assistance system with verbal information input via the microphone identifying an entity verbally;
  parse a telephone number associated with the entity from an electronic mail message or a page received from the directory assistance system; and
  store the telephone number into a memory of the telephone.

35. A method of programming telephone numbers and identifiers into a telephone comprising:
  initiating at a telephone a telephone call to a directory assistance system;
  providing the system with information identifying an entity verbally;
  thereafter, disconnecting a speaker of the telephone;
  receiving at least a telephone number associated with the entity information from the directory assistance system, the at least a telephone number being received as a data signal from the directory assistance system which is decoded by the telephone;
  reconnecting the speaker after receiving the data signal; and
  storing the at least a telephone number into the memory of the telephone.

36. A telephone comprising:
a first input device for inputting a telephone number;
a second input device for inputting audio input into the telephone;
a memory circuit;
a speaker, and
a programmed processor, said programmed processor:
  initiating a telephone call to a directory assistance system based on an input telephone number;
  providing the system with audio input from the second input device identifying an entity verbally;
  receiving at least a telephone number associated with the entity information from the directory assistance system, the at least a telephone number being received as a data signal from the directory assistance system which is decoded by the telephone;
  reconnecting the speaker after receiving the data signal; and
  storing the at least a telephone number into said memory.

37. A telephone system comprising:
a telephone comprising:
  a first input device for inputting a telephone number;
  a second input device for inputting audio input into the telephone;
  a memory circuit;
  a speaker; and
  a programmed processor, said programmed processor:
    initiating a telephone call to a directory assistance system based on an input telephone number;
    providing the directory assistance system with audio input from the second input device identifying an entity;
    disconnecting the speaker;
    receiving at least a telephone number associated with the entity information from the directory assistance system, the at least a telephone number being received as a data signal from the directory assistance system which is decoded by the telephone;
    reconnecting the speaker; and
    storing the at least a telephone number into said memory.

38. A telephone system comprising:
a telephone comprising:
  a first input device for inputting a telephone number;
  a second input device for inputting audio input into the telephone;
  a memory circuit;
  a speaker; and
  a controller coupled to said first input device and said memory circuit, said controller:
    initiating a telephone call to a directory assistance system based on an input telephone number;
    providing the directory assistance system with audio input from the second input device identifying an entity verbally;
    receiving at least a telephone number associated with the entity information from the directory assistance system, the at least a telephone number being received as an electronic mail message from the directory assistance system which is decoded by the telephone,
    reconnecting the speaker; and
    storing the at least a telephone number into said memory.

* * * * *

UNITED STATES PATENT AND TRADEMARK OFFICE
CERTIFICATE OF CORRECTION

PATENT NO. : 6,625,444 B1
DATED : September 23, 2003
INVENTOR(S) : Hoyt A. Fleming, III et al.

It is certified that error appears in the above-identified patent and that said Letters Patent is hereby corrected as shown below:

Column 7,
Line 7, replace colon with semicolon;
Line 38, replace comma with semicolon;

Column 9,
Line 50, replace comma with semicolon;

Column 10,
Line 52, replace comma with semicolon;

Signed and Sealed this

Ninth Day of December, 2003

JAMES E. ROGAN
*Director of the United States Patent and Trademark Office*